United States Patent [19]

Gisler

[11] Patent Number: 5,597,903
[45] Date of Patent: Jan. 28, 1997

[54] DISAZO DYES CONTAINING 1-AMINO-8-HYDROXY-NAPHTHALENE-3,6-OR 4,6-DISULFONIC ACID BISCOUPLING COMPONENT RADICALS AND 5-CYANO-2, 4-OR 4,6-DICHLOROPYRIMIDYL FIBER-REACTIVE GROUPS

[75] Inventor: Markus Gisler, Rheinfelden, Switzerland

[73] Assignee: Sandoz Ltd., Basel, Switzerland

[21] Appl. No.: 470,669

[22] Filed: Jun. 6, 1995

Related U.S. Application Data

[63] Continuation of Ser. No. 909,558, Jul. 6, 1992, abandoned, which is a continuation of Ser. No. 627,292, Dec. 14, 1990, abandoned.

[30] Foreign Application Priority Data

Dec. 16, 1989 [DE] Germany .......................... 39 41 639.9

[51] Int. Cl.⁶ .................................................. C09B 62/08
[52] U.S. Cl. ............................................................. 534/637
[58] Field of Search ............................................... 534/537

[56] References Cited

U.S. PATENT DOCUMENTS

| | | | |
|---|---|---|---|
| 3,120,507 | 2/1964 | Andrew et al. ............... | 260/146 |
| 4,425,270 | 1/1980 | Yamada et al. .............. | 260/153 |

FOREIGN PATENT DOCUMENTS

| | | |
|---|---|---|
| 167490 | 1/1986 | European Pat. Off. . |
| 84314 | 7/1986 | European Pat. Off. . |
| 225730 | 6/1987 | European Pat. Off. . |
| 192067 | 6/1988 | European Pat. Off. . |

OTHER PUBLICATIONS

Beech, *Fiber Reactive Dyes*, Logos Press Ltd., London (1972), pp. 177–178.

*Primary Examiner*—Johann Richter
*Assistant Examiner*—John Peabody
*Attorney, Agent, or Firm*—Robert S. Honor; Melvyn M. Kassenoff

[57] ABSTRACT

Compounds of the formula

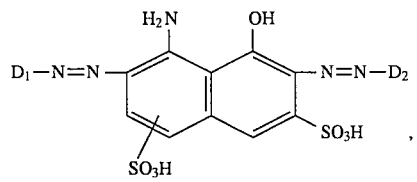

salts thereof, and mixtures of such compounds and salts, wherein $D_1$ is

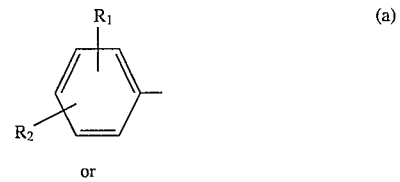

wherein $R_1$ is hydrogen, halo, $C_{1-4}$alkyl, $C_{1-4}$alkoxy, —$SO_3H$ or —COOH, $R_2$ is —COOH, —$CONR_6R_7$, —$SO_2NR_6R_7$ or —$SO_2$—X, wherein each of $R_6$ and $R_7$ is independently hydrogen, $C_{1-4}$alkyl, $C_{2-4}$-hydroxyalkyl or $C_{2-4}$sulfatoalkyl, or —$NR_6R_7$ is a saturated 5- or 6-membered heterocyclic ring containing no hetero atom in addition to the nitrogen atom to which $R_6$ and $R_7$ are attached or containing one hetero atom selected from nitrogen and oxygen in addition to said nitrogen atom, which ring is unsubstituted or substituted by 1 to 3 $C_{1-4}$alkyl groups, and m is 0, 1 or 2, and $D_2$ is

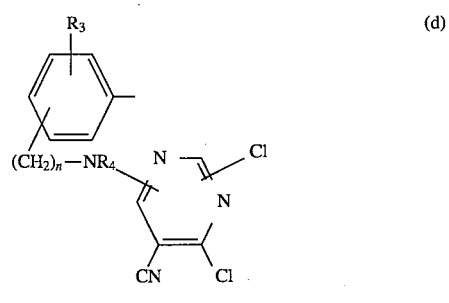

or

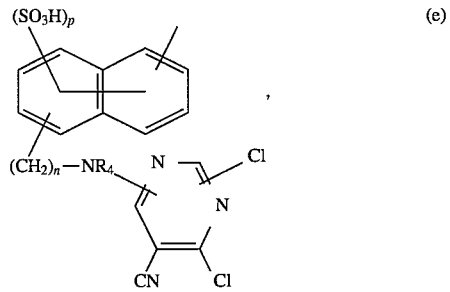

wherein $R_3$ is hydrogen, —$SO_3H$ or —COOH, $R_4$ is hydrogen, $C_{1-4}$alkyl or $C_{1-4}$alkyl monosubstituted by hydroxy, halo, cyano, —$SO_3H$, —$OSO_3H$ or —COOH, (Abstract continued on next page.)

n is 0 or 1, and
p is 1 or 2,
wherein
X is —CH=CH$_2$ or —W—Y,
wherein
W is linear or branched C$_{2-4}$alkylene, and
Y is hydroxy or a group which can be split off under alkaline conditions,
with the provisos that (i) R$_1$ may be —COOH only when R$_2$ is —SO$_2$—X, (ii) D$_2$ must be a group of Formula (d) when D$_1$ is a group of Formula (a) wherein R$_1$ is hydrogen, halo, C$_{1-4}$alkyl, C$_{1-4}$alkoxy or —SO$_3$H, and R$_2$ is —COOH, —CONR$_6$R$_7$ or —SO$_2$NR$_6$R$_7$ or a group of Formula (b), and (iii) D$_2$ must be a group of Formula (e) when D$_1$ is a group of Formula (a) wherein R$_1$ is —COOH, and R$_2$ is —SO$_2$—X, useful for dyeing or printing hydroxy group- or nitrogen-containing organic substrates, for example leather and fiber material comprising natural or synthetic polyamides or natural or regenerated cellulose, especially textile material comprising cotton. The obtained dyeings and printings show good general fastness properties such as good light fastness, wet fastnesses and resistance towards oxidative influences.

19 Claims, No Drawings

5,597,903

DISAZO DYES CONTAINING 1-AMINO-8-HYDROXY-NAPHTHALENE-3,6-OR 4,6-DISULFONIC ACID BISCOUPLING COMPONENT RADICALS AND 5-CYANO-2, 4-OR 4,6-DICHLOROPYRIMIDYL FIBER-REACTIVE GROUPS

This is a continuation of application Ser. No. 07/909,558, filed Jul. 6, 1992, now abandoned which is a continuation of application Ser. No. 07/627,292, filed Dec. 14, 1990 and now abandoned.

This invention relates to fibre-reactive disazo compounds and a process for their preparation. These compounds are suitable for use as fibre-reactive dyestuffs in any conventional dyeing or printing processes.

More particularly, the invention provides compounds of formula I

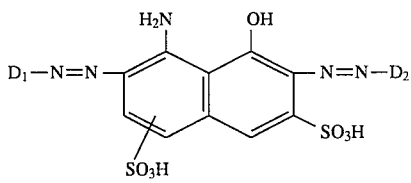

(I)

and salts thereof, in which
D$_1$ is

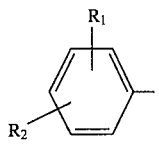

(a)

or

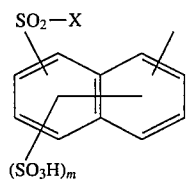

(b)

and
D$_2$ is

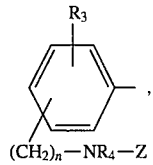

(d)

or
D$_1$ is

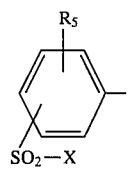

(c)

and D$_2$ is

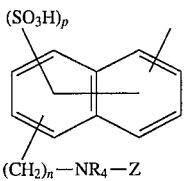

(e)

in which
R$_1$ is hydrogen, halogen, C$_{1-4}$alkyl, C$_{1-4}$alkoxy or —SO$_3$H,
R$_2$ is —COOH, —CONR$_6$R$_7$, —SO$_2$NR$_6$R$_7$ or —SO$_2$—X,
wherein each of R$_6$ and R$_7$ is independently hydrogen, C$_{1-4}$alkyl, C$_{2-4}$hydroxyalkyl or C$_{2-4}$sulphatoalkyl, or —NR$_6$R$_7$ is a saturated 5- or 6-membered heterocyclic ring which may contain one further hetero atom N or O and which is further unsubstituted or substituted by 1 to 3 C$_{1-4}$alkyl groups, and
X is —CH=CH$_2$ or —C$_{2-4}$alkylene—Y,
wherein Y is hydroxy or a radical which can be split off under alkaline conditions, e.g., —OSO$_3$H, Cl, Br, —OPO$_3$H$_2$, —SSO$_3$H, —OCOCH$_3$, —OCOC$_6$H$_5$ or —OSO$_2$CH$_3$;
R$_3$ is hydrogen, —SO$_3$H or —COOH,
R$_4$ is hydrogen, unsubstituted C$_{1-4}$alkyl or C$_{1-4}$alkyl monosubstituted by hydroxy, halogen, cyano, —SO$_3$H, —OSO$_3$H or —COOH,
R$_5$ is hydrogen, halogen, C$_{1-4}$alkyl, C$_{1-4}$alkoxy, —SO$_3$H or —COOH,
m is 0, 1 or 2,
n is 0 or 1,
p is 1 or 2, and
Z is

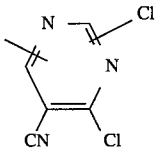

and mixtures of compounds of formula I.

In the specification, any alkyl or alkylene group present is linear or branched unless indicated otherwise.

In any hydroxy- or sulphato-substituted alkyl or alkylene group which is attached to a nitrogen atom, the hydroxy or sulphato group is preferably bound to a carbon atom which is not directly attached to this nitrogen atom.

Any halogen is preferably fluorine, chlorine or bromine; more preferably, it is chlorine or bromine and especially chlorine.

R$_1$ is preferably R$_{1a}$, where R$_{1a}$ is hydrogen, chlorine, methyl, methoxy or sulpho; more preferably, R$_1$ is R$_{1b}$, where R$_{1b}$ is hydrogen or sulpho. Most preferably R$_1$ is hydrogen.

R$_6$ is preferably R$_{6a}$, where R$_{6a}$ is hydrogen, methyl, ethyl, C$_{2-4}$hydroxyalkyl or C$_{2-4}$sulphatoalkyl; and R$_7$ is preferably R$_{7a}$, where R$_{7a}$ is hydrogen, C$_{2-4}$hydroxyalkyl or C$_{2-4}$sulphatoalkyl; or —NR$_{6a}$R$_{7a}$ is a piperidine, piperazine, N-methylpiperazine or morpholine ring.

More preferably, R$_6$ is R$_{6b}$, where R$_{6b}$ is hydrogen, methyl, ethyl, 2-hydroxyethyl or 2-sulphatoethyl; and R$_7$ is R$_{7b}$, where R$_{7b}$ is hydrogen, 2-hydroxyethyl or 2-sulphatoethyl; or —NR$_{6b}$R$_{7b}$ is a morpholine ring.

Most preferably, R$_6$ is R$_{6c}$, where R$_{6c}$ is hydrogen, 2-hydroxyethyl or 2-sulphatoethyl; and R$_7$ is R$_{7c}$, where y$_{7c}$ is hydrogen or 2-hydroxyethyl; or —NR$_{6c}$R$_{7c}$ is a morpholine ring.

X is preferably X$_a$, where X$_a$ is —CH═CH$_2$, —C$_{2-3}$alkylene—OH or —C$_{2-3}$alkylene—OSO$_3$H; more preferably, X is X$_b$, where X$_b$ is —CH═CH$_2$, —CH$_2$CH$_2$OH or —CH$_2$CH$_2$OSO$_3$H; most preferably it is X$_c$, where X$_c$ is —CH═CH$_2$ or —CH$_2$CH$_2$OSO$_3$H, especially —CH$_2$CH$_2$OSO$_3$H.

R$_2$ is preferably R$_{2a}$, where R$_{2a}$ is —COOH, —SO$_2$NR$_{6a}$R$_{7a}$ or —SO$_2$—X$_a$; more preferably it is R$_{2b}$, where R$_{2b}$ is —COOH, —SO$_2$NR$_{6b}$R$_{7b}$ or —SO$_2$—X$_b$. Even more preferably R$_2$ is R$_{2c}$, where R$_{2c}$ is —SO$_2$NR$_{6c}$R$_{7c}$ or —SO$_2$—X$_c$. Most preferably R$_2$ is —SO$_2$CH$_2$CH$_2$OSO$_3$H.

A radical (a) is preferably of formula (a$_1$)

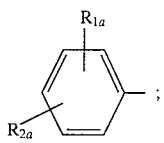

more preferably of formula (a$_2$),

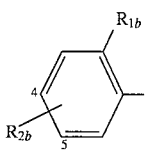

in which R$_{2b}$ is in the 4- or 5-position; most preferably of formula (a$_3$),

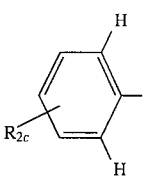

in which R$_{2c}$ is especially —SO$_2$CH$_2$CH$_2$OSO$_3$H.

m is preferably 0 or 1.

A radical (b) is preferably (b$_1$), where (b$_1$) is one of the radicals of the formulae

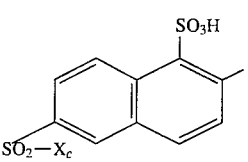

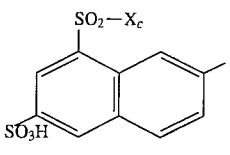

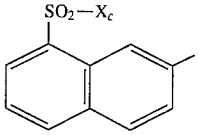

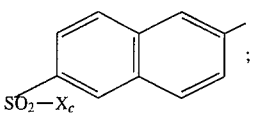

more preferably it is (b$_2$), where (b$_2$) is one of the radicals of the formulae (b$_{11}$), (b$_{12}$) and (b$_{13}$).

R$_3$ is preferably R$_{3a}$, where R$_{3a}$ is —COOH or —SO$_3$H. Most preferably R$_3$ is —SO$_3$H.

R$_4$ is preferably R$_{4a}$, where R$_{4a}$ is hydrogen, methyl, ethyl, 2-hydroxyethyl, —(CH$_2$)$_q$—SO$_3$H, —(CH$_2$)$_q$—COOH or —(CH$_2$)$_q$—OSO$_3$H, in which q is 1, 2 or 3.

More preferably R$_4$ is R$_{4b}$, where R$_{4b}$ is hydrogen or methyl. Most preferably R$_4$ is hydrogen.

A radical (d) is preferably of formula (d$_1$)

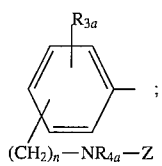

more preferably of formula (d$_2$),

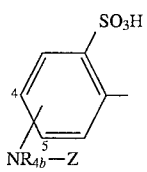

in which —NR$_{4b}$—Z is in the 4- or 5-position; most preferably of formula (d$_3$)

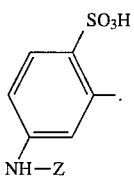

R$_5$ is preferably R$_{5a}$, where R$_{5a}$ is hydrogen, chlorine, methyl, methoxy or sulpho. More preferably R$_5$ is R$_{5b}$, where R$_{5b}$ is hydrogen or sulpho. Most preferably R$_5$ is hydrogen.

A radical (c) is preferably of formula (c$_1$),

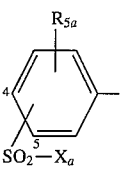

in which —SO$_2$—X$_a$ is preferably in the 4- or 5-position; more preferably it is of formula (c$_2$),

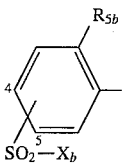

in which —SO$_2$—X$_b$ is in the 4- or 5-position; most preferably it is of formula (c$_3$),

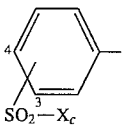

in which —SO$_2$—X$_c$ is in the 3- or 4-position.

A radical (c) is preferably of formula ($e_1$),

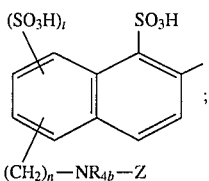 ($e_1$)

in which t is 0 or 1; more preferably of formula ($e_2$),

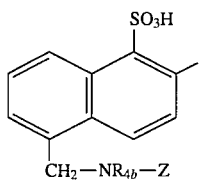 ($e_2$)

in which $R_{4b}$ is most preferably hydrogen.

Furthermore, in the 1-amino-8-hydroxynaphthalene radical of compounds of formula I the floating sulpho substituent is preferably in the 3-position.

Preferred compounds of formula I correspond to formula Ia

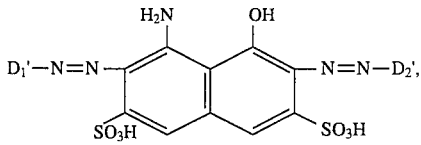 (Ia)

and salts thereof,
in which
$D_1'$ is a radical ($a_1$) or ($b_1$) and
$D_2'$ is a radical ($d_1$); or
$D_1'$ is a radical ($c_1$) and
$D_2'$ is a radical ($e_1$), as defined above.

More preferred are compounds of formula Ia in which $D_1'$ is $D_1''$ and $D_2'$ is $D_2''$, where $D_1''$ is a radical ($a_2$) or ($b_2$) and $D_2''$ is a radical ($d_2$); or $D_1''$ is a radical ($c_3$) and $D_2''$ is a radical ($e_2$), as defined above.

Most preferred are compounds of formula Ia in which $D_1'$ is $D_1'''$ and $D_2'$ is $D_2'''$, where $D_1'''$ is a radical ($a_3$) and $D_2'''$ is a radical ($d_3$), as defined above.

Further preferred compounds of formula I are those of formula Ib

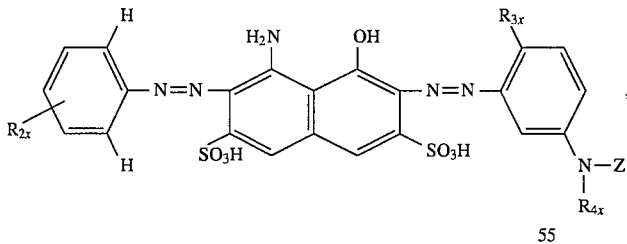 (Ib)

and salts thereof,
wherein
$R_{2x}$ is —COOH, —$SO_2$—$C_{2-4}$alkylene—OH, —$SO_2$—$C_{2-4}$alkylene—$OSO_3H$, —$CONR_6R_7$ or —$SO_2NR_6R_7$
$R_{3x}$ is —COOH or —$SO_3H$, and
$R_{4x}$ is hydrogen or $C_{1-4}$alkyl,
wherein $R_6$, $R_7$ and Z are as defined above.

When a compound of formula I is in salt form, the cations associated with the sulpho groups and any carboxy group are not critical and may be any of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds of formula I, and mixtures thereof, by the reaction under neutral to weakly basic conditions of a diazonium salt of an amine of formula II $$D_2—NH_2 \qquad \text{II}$$

or a mixture of such amines, wherein $D_2$ is as hereinabove defined, with a compound of formula III

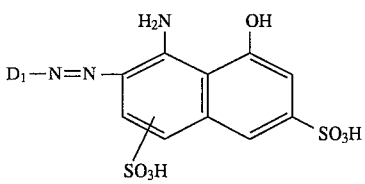 III or a mixture of such compounds, wherein $D_1$ is as hereinabove defined.

The compounds of formula I may be isolated in accordance with known methods, for example, by conventional salting out with alkali metal salt, filtering and drying, optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting compounds of formulae II and III are either known or may be readily made from known materials using known methods.

Amines according to formula II may be obtained by the condensation reaction of compounds of formula IV or formula V

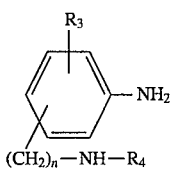 IV

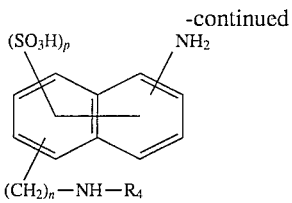

wherein $R_3$, $R_4$, n and p are as hereinabove defined, with 5-cyano-2,4,6-trichloropyrimidine, this reaction being carried out at a temperature of 0°–40° C. (preferably 0°–20° C.) and at a pH of from 6–9.

Compounds of formula III may be prepared by the reaction under acidic conditions of the diazonium salt of amines according to one of the formulae VI, VII and VIII, $$\text{VI}$$

$$\text{VII}$$

$$\text{VIII}$$

in which $R_1$, $R_2$, $R_5$, X and m are as hereinabove defined, with 1-amino-8-hydroxynaphthalene-3,6- or -4,6-disulphonic acid.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of 30° to 60° C.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good dry and wet light fastness and good wet fastness properties such as wash, water, sea water and sweat fastness. They also exhibit good resistance to oxidation agents such as chlorinated water, hypochlorite bleach, peroxide bleach and perborate-containing washing detergents.

Furthermore, the dyeings and prints obtained with the compounds of formula I show notably high stability to acid hydrolysis, for example, a dyeing contacted with dilute acetic acid shows only slight staining of the undyed accompanying fabric.

The invention is further illustrated with reference to the following non-limiting examples, in which all parts are expressed by weight unless otherwise stated and all temperatures are in degrees Centigrade.

EXAMPLE 1

29.5 Parts of 4-aminophenyl-(2'-sulphatoethyl)sulphone are suspended in 43.0 parts of concentrated hydrochloric acid and stirred for an hour. 125 Parts of ice are added, followed by 26.2 parts of a 4N sodium nitrite solution, this being added dropwise under the surface of the mixture. The mixture is stirred for two hours during which time the temperature is maintained at 0°–5°. Excessive nitrite is destroyed by the addition of sulphamic acid.

31.9 Parts of 1-amino-8-hydroxynaphthalene-3,6-disulphonic acid are added to 150 parts of water and the solution is made neutral by the addition of 10.5 parts of concentrated sodium hydroxide solution. This solution is added dropwise to the cooled solution described in the previous paragraph. The mixture is then stirred for 3 hours and the temperature held at 5°–10° during this time. After this, the mixture is neutralised by the addition of 35 parts of concentrated sodium hydroxide solution, and filtered, and the residue is washed with 400 parts of water. The filtrate is blended with the wash liquid, and a solid is salted out with common salt and filtered off. The resultant red filter cake is retained for later use.

21.8 Parts of 2-cyano-2,4,6-trichloropyrimidine are dispersed in a mixture of 140 parts of ice and 35 parts of water and stirred for 45 minutes at 0°–2°.

8.8 Parts of 2,4-diaminobenzenesulphonic acid are dispersed in 140 parts of water and neutralised with 9.5 parts of sodium hydroxide. The resulting solution is added dropwise over the period of an hour to the 5-cyano-2,4,6-trichloropyrimidine dispersion previously described, the temperature being maintained at 0°–2°. The suspension thus obtained is brought to pH 4 by the addition of sodium carbonate solution and is then blended with 26.2 parts of a 4N sodium nitrite solution. This blend is added to a mixture consisting of 150 parts of ice, 20 parts of water and 44 parts of concentrated hydrochloric acid to give a diazonium salt solution.

The red filter cake whose preparation is described hereinabove is dispersed in 300 parts of water, 2 parts of a 20% by weight solution of sodium carbonate are added and the dispersion is cooled to 5°. The pH of the abovementioned diazonium salt solution is brought to 7.5–8, and it is added dropwise to the red filter cake dispersion. The resulting dyestuff is salted out, filtered off and dried under vacuum. It has the formula

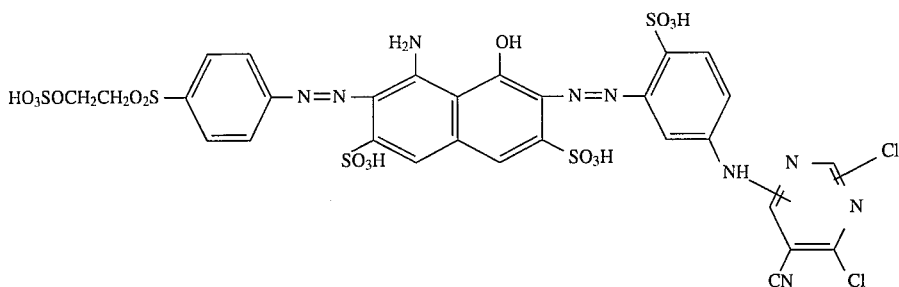

and dyes cotton in deep navy blue tones. These dyeings exhibit good properties such as light- and wet-fastnesses and are stable in the presence of oxidising agents.

EXAMPLES 2–54

Further analogous compounds may be made by the methods described in Example 1. These compounds correspond to one of the following formulae

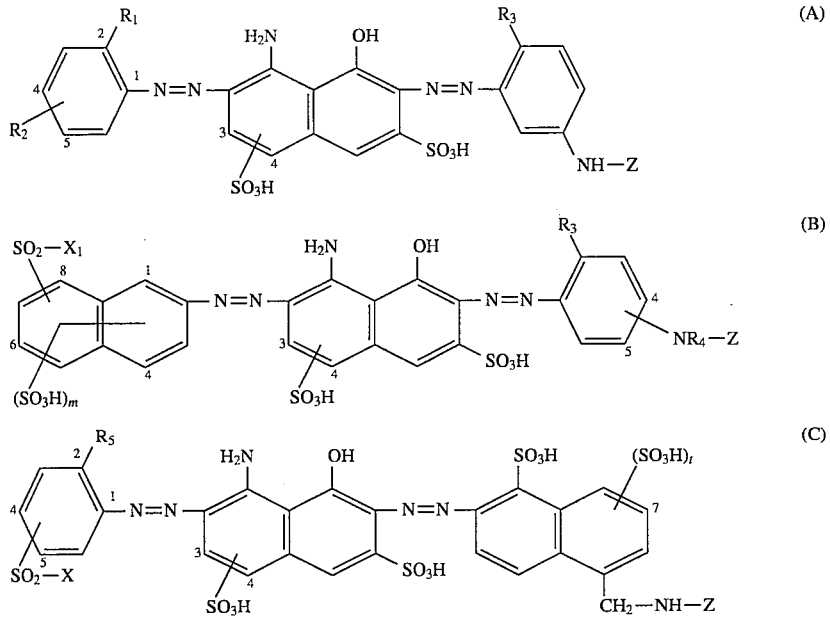

and the nature of the substituents for each compound is given in Tables 1 [compounds corresponding to formula (A)], 2 [compounds corresponding to formula (B)] and 3 (compounds corresponding to formula (C)]. In these Tables, the entity Z is

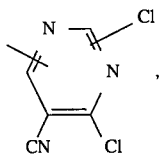

and X is $X_1$, $X_2$ or $X_3$
where
  $X_1$ is —CH$_2$CH$_2$OSO$_3$H,
  $X_2$ is —CH$_2$CH$_2$OH, and
  $X_3$ is —CH=CH$_2$.

The compounds of Examples 2–54 may be applied to substrates which comprise cellulose fibres, particularly for dyeing in navy blue tones textile materials comprising cotton using conventional exhaust dyeing or printing processes. The dyeings and printings obtained thereby on cotton exhibit good light- and wet-fastness properties and they are resistant to oxidising agents.

TABLE 1

| Example No. | $R_1$ | $R_2$ | Position of $R_2$ | Position of $SO_3H$ | $R_3$ |
|---|---|---|---|---|---|
| 2 | H | $-SO_2-X_1$ | 3 | 3 | $-SO_3H$ |
| 3 | H | " | 4 | 4 | " |
| 4 | H | " | 4 | 3 | $-COOH$ |
| 5 | H | " | 3 | 3 | " |
| 6 | H | $-SO_2-X_2$ | 4 | 3 | $-SO_3H$ |
| 7 | H | " | 3 | 3 | " |
| 8 | H | " | 4 | 3 | $-COOH$ |
| 9 | $-SO_3H$ | $-SO_2-X_3$ | 4 | 3 | " |
| 10 | " | " | 4 | 4 | " |
| 11 | H | $-SO_2NH_2$ | 4 | 3 | $-SO_3H$ |
| 12 | H | " | 3 | 3 | " |
| 13 | H | $-SO_2NHCH_2CH_2OH$ | 4 | 3 | " |
| 14 | H | " | 3 | 4 | " |
| 15 | H | " | 4 | 3 | $-COOH$ |
| 16 | H | " | 3 | 3 | " |
| 17 | H | $-SO_2NHCH_2CH_2OSO_3H$ | 4 | 3 | $-SO_3H$ |
| 18 | H | " | 3 | 3 | $-COOH$ |
| 19 | H | $-SO_2N(CH_2CH_2OH)_2$ | 4 | 3 | " |
| 20 | H | " | 4 | 3 | $-SO_3H$ |
| 21 | H |  $-SO_2N\bigg\langle\begin{array}{c}\\\\\end{array}\bigg\rangle O$ | 4 | 3 | " |
| 22 | H | " | 3 | 3 | " |
| 23 | H | " | 4 | 4 | " |
| 24 | H | $-COOH$ | 4 | 3 | $-COOH$ |
| 25 | H | " | 3 | 3 | " |
| 26 | H | " | 4 | 3 | $-SO_3H$ |
| 27 | H | " | 3 | 3 | " |
| 28 | $-SO_3H$ | $-SO_2-X_1$ | 4 | 3 | " |
| 29 | H | " | 3 | 4 | " |
| 30 | $-SO_3H$ | $-SO_2-X_2$ | 4 | 3 | " |
| 31 | $-SO_3H$ | $-SO_2-X_1$ | 3 | 4 | H |
| 32 | H | $-SO_2CH_2\underset{\underset{CH_3}{|}}{C}HOSO_3H$ | 4 | 3 | $-SO_3H$ |
| 33 | $-SO_3H$ | $-SO_2-X_3$ | 4 | 3 | " |
| 34 | " | " | 5 | 3 | " |

TABLE 2

| Example No. | Position of $-SO_2-X_1$ | m | Position of $(SO_3H)_m$ | Position of $SO_3H$ | $R_3$ | $R_4$ | Position of $-NR_4-Z$ |
|---|---|---|---|---|---|---|---|
| 35 | 8 | 1 | 6 | 3 | $-SO_3H$ | H | 5 |
| 36 | 8 | 1 | 6 | 3 | " | H | 4 |
| 37 | 8 | 1 | 6 | 4 | " | $-CH_3$ | 5 |
| 38 | 8 | 1 | 6 | 3 | $-COOH$ | H | 5 |
| 39 | 8 | 1 | 6 | 4 | " | H | 4 |
| 40 | 6 | 1 | 1 | 3 | " | H | 5 |
| 41 | 6 | 1 | 1 | 3 | " | $-CH_3$ | 5 |
| 42 | 6 | 1 | 1 | 3 | $-SO_3H$ | H | 5 |
| 43 | 6 | 1 | 1 | 4 | " | H | 5 |
| 44 | 8 | 0 | — | 3 | " | H | 5 |
| 45 | 8 | 0 | — | 4 | " | H | 5 |
| 46 | 8 | 0 | — | 4 | " | $-CH_3$ | 4 |
| 47 | 8 | 0 | — | 3 | " | H | 4 |

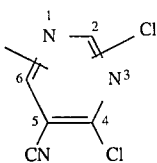

By the preparation method described in Example 1 the compounds of Examples 1–54 are obtained in sodium salt form. By changing the reaction or isolation conditions or by using other known methods, it is possible to produce the compounds in free acid form or in other salt forms or mixed salt forms which contain one or more of the cations mentioned hereinabove.

It should be noted that the group Z

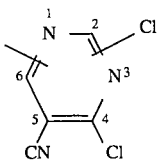

can occur in two isomeric forms, with the floating chlorine substituent in either the 2- or the 6-position. The naturally-occuring ratio of 2-position to 6-position is about 2:1. In general, it is preferred to use this mixture as is without resorting to the isolation of a single isomer, but should this be desired it can be readily achieved by conventional methods.

In the following examples, the application of compounds of this invention is illustrated.

Application Example A 0.3 Part of the dyestuff of Example 1 is dissolved in 300 parts of demineralised water and 15 parts of Glauber's salt (calcined) are added. The dyebath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soap. After being rinsed with running hot water (for 3 minutes) and centrifuged, the dyeing is dried in a cabinet dryer at about 70°. A navy blue cotton dyeing is obtained showing good light- and wet-fastness properties which is stable towards oxidative influences.

Application Example B

To a dyebath containing in 300 parts of demineralised water 10 parts of Glauber's salt (calcined), 10 parts of cotton fabric (bleached) are added. The bath is heated to 40° within 10 minutes, and 0.5 part of the dyestuff of Example 1 is added. After a further 30 minutes at 40° 3 parts of sodium carbonate (calcined) are added and dyeing is continued at 40° for a further 45 minutes.

The dyed fabric is rinsed with running cold and then hot water and washed at the boil according to the method given in Application Example A. After rinsing and drying a navy blue cotton dyeing is obtained which has the same good fastness properties as indicated in Application Example A.

Similarly, the dyestuffs of Examples 2–54 or mixtures of the exemplified dyestuffs may be employed to dye cotton in accordance with the method described in Application Example A or B. The cotton dyeings thus obtained are navy blue and show good fastness properties.

Application Example C

A printing paste consisting of

| |
|---|
| 40 parts of the dyestuff of Example 1 |
| 100 parts of urea |
| 350 parts of water |
| 500 parts of a 4% sodium alginate thickener and |
| 10 parts of sodium bicarbonate |
| 1000 parts in all | is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A navy blue print is obtained which has good general fastness properties.

Similarly, the dyestuffs of Examples 2 to 54 or mixtures of the exemplified dyestuffs may be employed to print cotton in accordance with the method given in Application Example C. All prints obtained are navy blue and show good fastness properties.

What is claimed is:

1. A compound of the formula

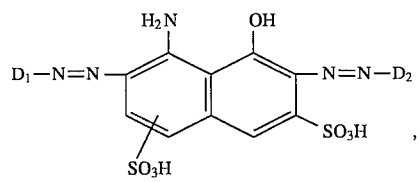

or a salt thereof, or a mixture of such compounds or salts, wherein $D_1$ is

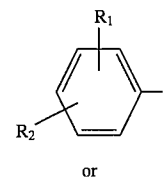  (a)

or

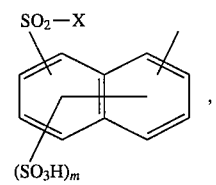  (b)

wherein $R_1$ is hydrogen, halo; $C_{1-4}$alkyl, $C_{1-4}$alkoxy, —SO$_3$H or —COOH, $R_2$ is —COOH, —CONR$_6$R$_7$, —SO$_2$NR$_6$R$_7$ or —SO$_2$—X, wherein each of R$_6$ and R$_7$ is independently hydrogen, $C_{1-4}$alkyl, $C_{2-4}$hydroxyalkyl or $C_{2-4}$sulfatoalkyl, and m is 0, 1 or 2, and D₂ is

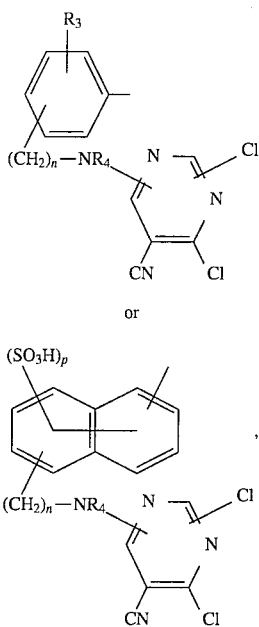

wherein
R₃ is hydrogen, —SO₃H or —COOH,
R₄ is hydrogen, C₁₋₄alkyl or C₁₋₄alkyl monosubstituted by hydroxy, halo, cyano, —SO₃H, —OSO₃H or —COOH,
n is 0 or 1, and
p is 1 or 2,
wherein
X is —CH=CH₂ or —W—Y,
wherein
W is linear or branched C₂₋₄alkylene, and
Y is hydroxy, OSO₃H, chloro, bromo, —OPO₃H₂, —SSO₃H, —OCOCH₃, —OCOC₆H₅ or —OSO₂CH₃, with the provisos that (i) R₁ may be —COOH only when R₂ is —SO₂—X, (ii) D₂ must be a group of Formula (d) when D₁ is a group of Formula (a) wherein R₁ is hydrogen, halo, C₁₋₄alkyl, C₁₋₄alkoxy or —SO₃H, and R₂ is —COOH, —CONR₆R₇ or —SO₂NR₆R₇ or a group of Formula (b), and (iii) D₂ must be a group of Formula (e) when D₁ is a group of Formula (a) wherein R₁ is —COOH, and R₂ is —SO₂—X.

2. A compound according to claim 1,
or a water-soluble salt thereof each cation of which is independently a non-chromophoric cation,
or a mixture of such compounds or water-soluble salts.

3. A compound according to claim 2, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium, or a mixture of such of compounds or water-soluble salts.

4. A compound according to claim 3, or a water-soluble salt thereof each cation of which is lithium, sodium, potassium or ammonium, or a mixture of such compounds or water-soluble salts.

5. A compound according to claim 4, or a water-soluble salt thereof each cation of which is independently a non-chromophoric cation, or a mixture of such compounds or water-soluble salts, wherein each halo is independently fluoro, chloro or bromo, and the hydroxy group of any hydroxyalkyl group attached to a nitrogen atom and the sulfato group of any sulfatoalkyl group attached to a nitrogen atom is attached to a carbon atom not directly attached to the nitrogen atom.

6. A compound according to claim 2, or a water-soluble salt thereof each cation of which is independently a non-chromophoric cation, or a mixture of such compounds or water-soluble salts, wherein X is —CH=CH₂, —Wₐ—OH or —WₐOSO₃H,
wherein Wₐ is linear or branched C₂₋₃alkylene.

7. A compound according to claim 6, or a water-soluble salt thereof each cation of which is independently a non-chromophoric cation, or a mixture of such compounds or water-soluble salts, wherein X is —CH=CH₂, —CH₂CH₂OH or —CH₂CH₂OSO₃H.

8. A compound according to claim 2, or a water-soluble salt thereof each cation of which is independently a non-chromophoric cation, or a mixture of such compounds or water-soluble salts, wherein
D₁ is

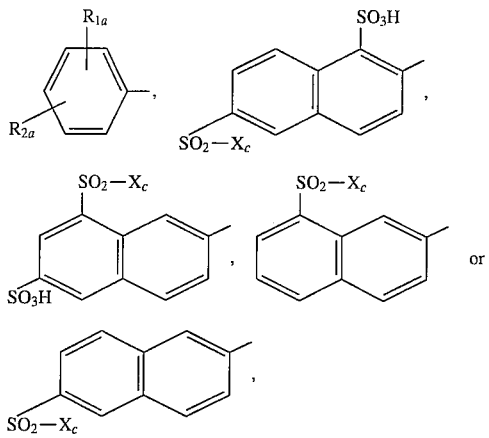

wherein
R₁ₐ is hydrogen, chloro, methyl, methoxy or —SO₃H,
R₂ₐ is —COOH, —SO₂NR₆ₐR₇ₐ or —SO₂—Xₐ,
wherein
R₆ₐ is hydrogen, methyl, ethyl, C₂₋₄hydroxyalkyl or C₂₋₄sulfatoalkyl, and R₇ₐ is hydrogen, C₂₋₄hydroxyalkyl or C₂₋₄sulfatoalkyl, and
Xₐ is —CH=CH₂, —Wₐ—OH or —Wₐ—OSO₃H
wherein
Wₐ is linear or branched C₂₋₃alkylene, and
Xc is —CH=CH₂ or —CH₂CH₂OSO₃H.

9. A compound according to claim 8, or a water-soluble salt thereof each cation of which is independently a non-chromophoric cation, or a mixture of such compounds or water-soluble salts, wherein
D₁ is

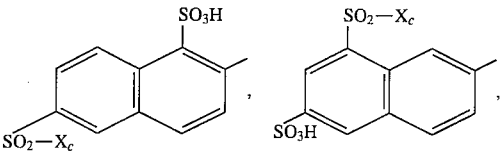

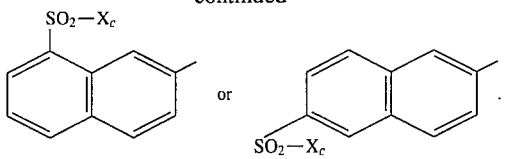

10. A compound according to claim 2, or a water-soluble salt thereof each cation of which is independently a non-chromophoric cation, or a mixture of such compounds or water-soluble salts, wherein $D_2$ is

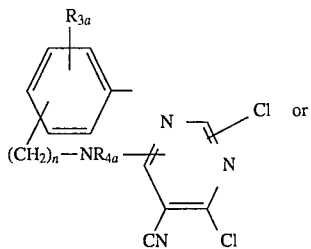 or

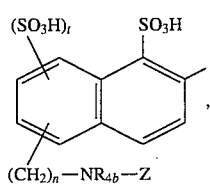

wherein $R_{3a}$ is —COOH or —SO$_3$H, $R_{4a}$ is hydrogen, methyl, ethyl, 2-hydroxyethyl, —(CH$_2$)$_q$—SO$_3$H, —(CH$_2$)$_q$—COOH or —(CH$_2$)$_q$—OSO$_3$H, wherein q is 1, 2 or 3, $R_{4b}$ is hydrogen or methyl, and t is 0 or 1.

11. A compound according to claim 10, or a water-soluble salt thereof each cation of which is independently a non-chromophoric cation, or a mixture of such compounds or water-soluble salts, wherein $D_2$ is

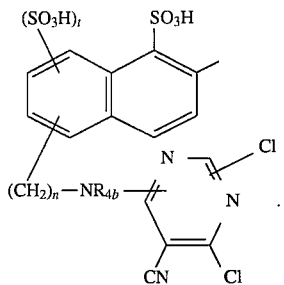

12. A compound according to claim 2 having the formula

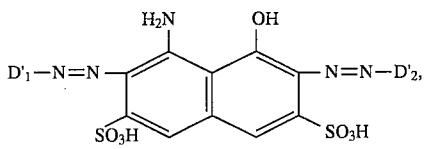

or a water-soluble salt thereof each cation of which is independently a non-chromophoric cation, or a mixture of such compounds or water-soluble salts, wherein $D_1'$ is

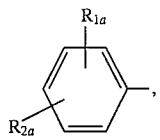 (a$_1$)

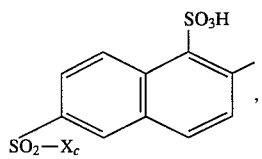 (b$_{11}$)

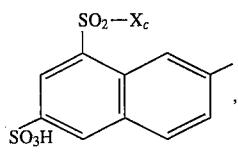 (b$_{12}$)

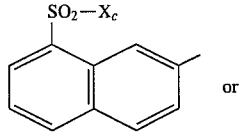 (b$_{13}$) or

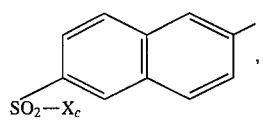 (b$_{14}$)

wherein $R_{1a}$ is hydrogen, chloro, methyl, methoxy or —$SO_3H$, $R_{2a}$ is —COOH, —$SO_2NR_{6a}R_{7a}$ or —$SO_2$—$X_a$, wherein $R_{6a}$ is hydrogen, methyl, ethyl, $C_{2-4}$hydroxyalkyl or $C_{2-4}$sulfatoalkyl, and $R_{7a}$ is hydrogen, $C_{2-4}$hydroxyalkyl or $C_{2-4}$sulfatoalkyl, $X_a$ is —CH=$CH_2$, —$W_a$—OH or —$W_a$—$OSO_3H$, wherein $W_a$ is linear or branched $C_{2-3}$alkylene, and $X_c$ is —CH=$CH_2$ or —$CH_2CH_2OSO_3H$, wherein $D_2'$ is

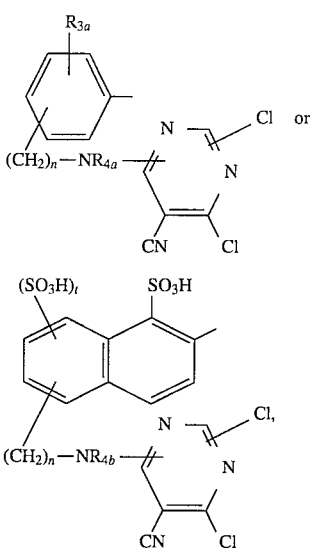
(d$_1$)

(e$_1$)

wherein $R_{3a}$ is —COOH or —$SO_3H$, $R_{4a}$ is hydrogen, methyl, ethyl, 2-hydroxyethyl, —$(CH_2)_q$—$SO_3H$, —$(CH_2)_q$—COOH or —$(CH_2)_q$—$OSO_3H$, wherein q is 1, 2 or 3, $R_{4b}$ is hydrogen or methyl, n is 0 or 1, and t is 0 or 1, with the proviso that $D_2'$ must be a group of Formula (d$_1$) when $D_1'$ is a group of Formula (a$_1$) wherein $R_{2a}$ is —COOH or —$SO_2NR_{6a}R_{7a}$ or a group of Formula (b$_{11}$), (b$_{12}$), (b$_{13}$) or (b$_{14}$).

13. A compound according to claim 12, or a water-soluble salt thereof each cation of which is independently a non-chromophoric cation, or a mixture of such compounds or water-soluble salts, wherein $D_1'$ is

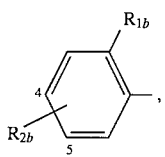
(a$_2$)

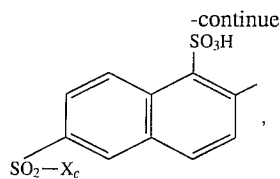
(b$_{11}$)

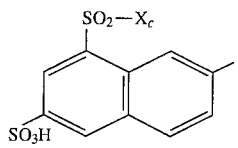
(b$_{12}$)

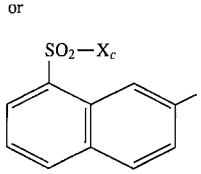
(b$_{13}$)

wherein $R_{1b}$ is hydrogen or —$SO_3H$, $R_{2b}$ is —COOH, —$SO_2NR_{6b}R_{7b}$ or —$SO_2$—$X_b$, wherein $R_{6b}$ is hydrogen, methyl, ethyl, 2-hydroxyethyl or 2-sulfatoethyl, and ethyl, and $R_{7b}$ is hydrogen, 2-hydroxyethyl or 2-sulfatoethyl, and $X_b$ is —CH=$CH_2$, —$CH_2CH_2OH$ or —$CH_2CH_2OSO_3H$, with the proviso that $R_{2b}$ is in the 4- or 5-position of the ring to which it is attached, and $D_2'$ is

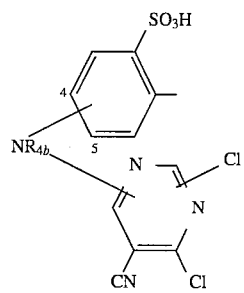
(d$_2$)

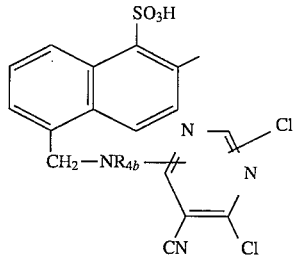
(e$_2$)

with the proviso that the —$NR_{4b}$— radical is in the 4- or 5-position of the 2-sulfophenyl group with the proviso that $D_2'$ must be a group of Formula (d$_2$) when $D_1'$ is a group of Formula (a$_2$) wherein $R_{2b}$ is —COOH or —$SO_2NR_{6b}R_{7b}$.

14. A compound according to claim 13, or a water-soluble salt thereof each cation of which is independently a non-chromophoric cation, or a mixture of such compounds or water-soluble salts, wherein $D_1'$ is

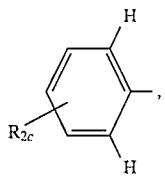

wherein $R_{2c}$ is $-SO_2NR_{6c}R_{7c}$ or $-SO_2-X_c$,
wherein
$R_{6c}$ is hydrogen, 2-hydroxyethyl or 2-sulfatoethyl, and
$R_{7c}$ is hydrogen or 2-hydroxyethyl, and
$X_c$ is $-CH=CH_2$ or $-CH_2CH_2OSO_3H$, and $D_2'$ is

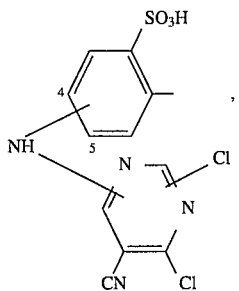

with the proviso that the —NH— radical is in the 4- or 5-position of the 2-sulfophenyl group.

15. A compound according to claim 14, or a water-soluble salt thereof each cation of which is independently a non-chromophoric cation, or a mixture of such compounds or water-soluble salts, wherein $D_1'$ is

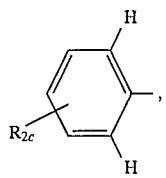

wherein $R_{2c}$ is $-SO_2NR_{6c}R_{7c}$ or $-SO_2-X_c$,
wherein
$R_{6c}$ is hydrogen, 2-hydroxyethyl or 2-sulfatoethyl, and
$R_{7c}$ is hydrogen or 2-hydroxyethyl, and $D_2'$ is

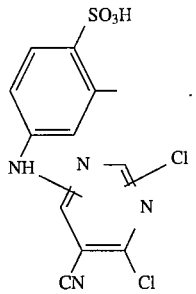

16. A compound according to claim 2 having the formula

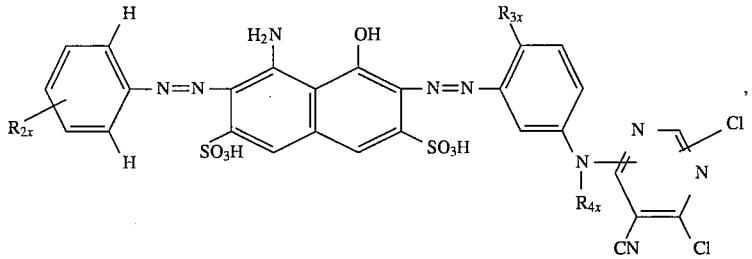

or a water-soluble salt thereof each cation of which is independently a non-chromophoric cation, or a mixture of such compounds or water-soluble salts, wherein $R_{2x}$ is $-COOH$, $-SO_2-W-OH$, $-SO_2-W-OSO_3H$, $-CONR_6R_7$ or $-SO_2NR_6R_7$,
wherein each of $R_6$ and $R_7$ is independently hydrogen, $C_{1-4}$alkyl, $C_{2-4}$hydroxyalkyl or $C_{2-4}$sulfatoalkyl, and W is linear or branched $C_{2-4}$alkylene, $R_{3x}$ is $-COOH$ or $-SO_3H$, and $R_{4x}$ is hydrogen or $C_{1-4}$alkyl.

17. A compound according to claim 16, or a water-soluble salt thereof each cation of which is independently a non-chromophoric cation, or a mixture of such compounds or water-soluble salts, wherein $R_6$ is hydrogen, methyl, ethyl, $C_{2-4}$hydroxyalkyl or $C_{2-4}$sulfatoalkyl, and $R_7$ is hydrogen, $C_{2-4}$hydroxyalkyl or $C_{2-4}$sulfatoalkyl.

18. A compound according to claim 17, having the formula

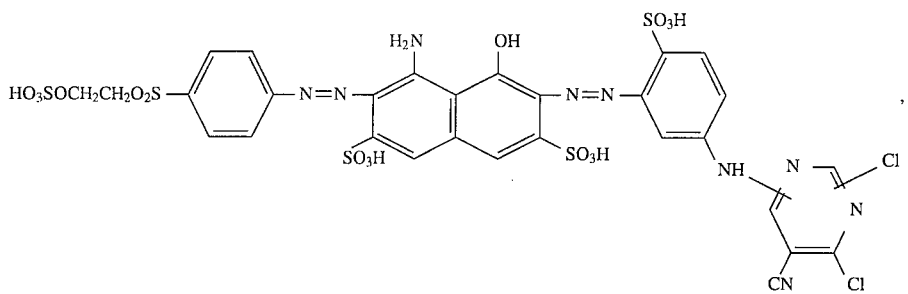
or a water-soluble salt thereof each cation of which is independently a non-chromophoric cation, or a mixture of such compounds or water-soluble salts.
19. A sodium salt of a compound according to claim 18 or a mixture of such sodium salts.
* * * * *